Aug. 8, 1961 E. W. GOTTSCHALK 2,995,320
SUPERSONIC AIRCRAFT HAVING EXTENSIBLE NOSE CONE
Filed April 14, 1958 4 Sheets-Sheet 2

INVENTOR.
ELDON W. GOTTSCHALK
BY
W. J. Gribble
AGENT

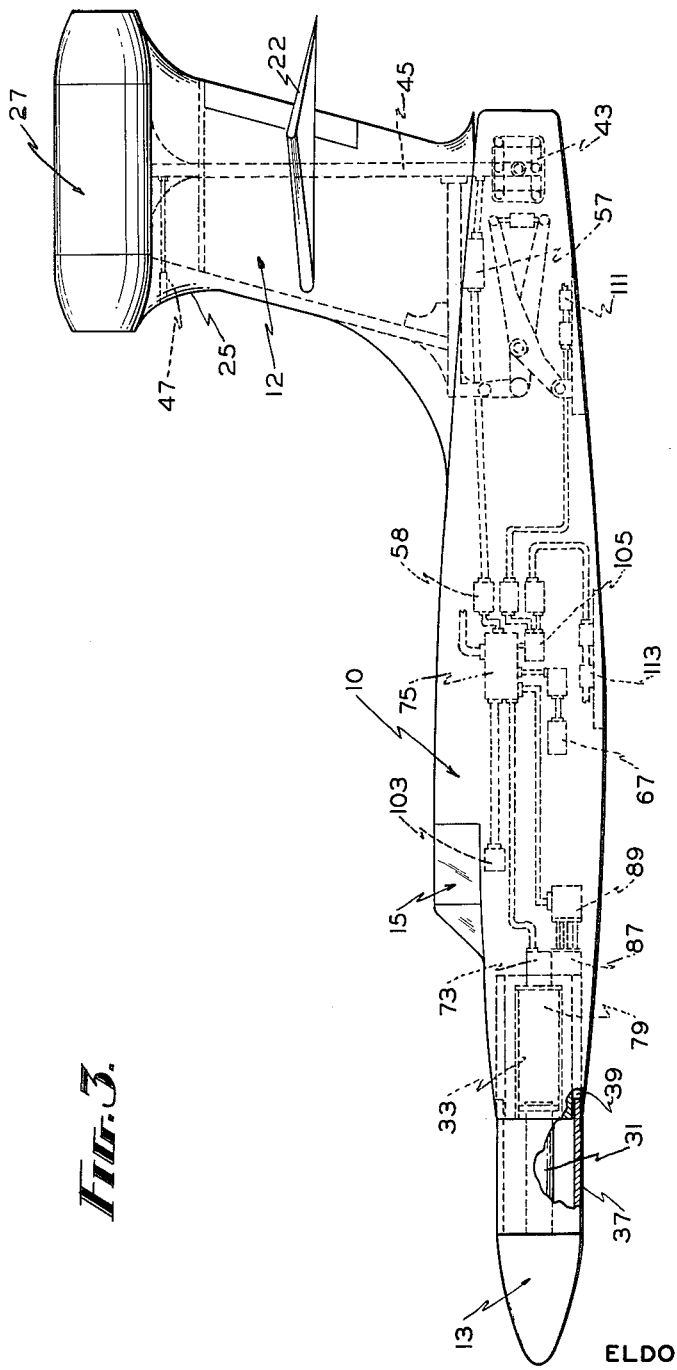

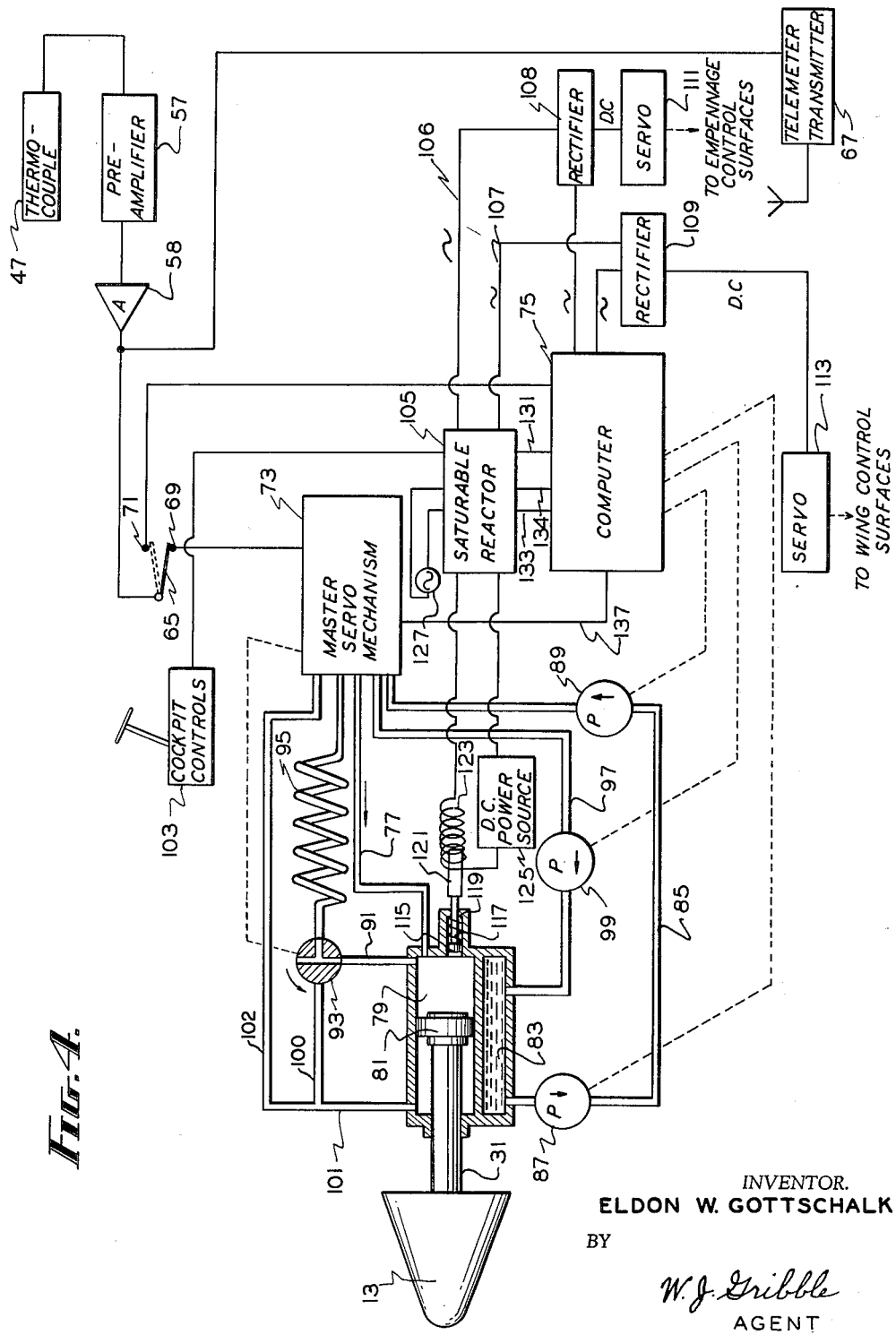

# United States Patent Office 2,995,320
Patented Aug. 8, 1961

2,995,320
SUPERSONIC AIRCRAFT HAVING EXTENSIBLE NOSE CONE
Eldon W. Gottschalk, 7012 40th St., NE., Seattle 15, Wash.
Filed Apr. 14, 1958, Ser. No. 728,446
9 Claims. (Cl. 244—15)

The invention relates to self propelled flight vehicles and more particularly to such flight vehicles suitable for operation at all speeds whether subsonic, transonic, sonic, or supersonic.

The conventional flight vehicle whether a winged plane, a rocket missile, or any other flight device, is designed so that its outer configuration is optimum for a particular flight condition. For instance, the fuselage and wing configuration and relationship for a transonic military aircraft is designed for maximum efficiency at the craft's designed cruising speed. Operation at speeds, altitudes, and air densities other than the prescribed cruising conditions are not wholly efficient. These same factors enter into the design of flight vehicles whether intended for use within or outside of the earth's atmosphere.

Vehicles for use outside the earth's atmosphere must still be designed with the varying atmospheric density in mind since they must traverse the atmosphere before reaching the airless void beyond the earth's air blanket. The ascent of vehicles intended to operate beyond the earth's atmosphere presents a lesser problem than does the re-entry of such vehicles into the atmosphere. Conventionally the velocity of the vehicle increases as the air density lessens. Therefore, the heat problem encountered from the friction of the atmosphere is comparatively small as the vehicle ascends. Conventional re-entry, however, is made at near the maximum velocity of the vehicle. Deceleration due to the increased resistance of more dense air is not rapid enough to prevent a heat build up both from the direct contact of the atmosphere on all surfaces and from the parasitical drag and shock waves resultant from the above sonic speed of the vehicle.

The re-entry problem is the subject of much research. However, the frequency with which the problem will be encountered will grow as commercial and military vehicles seek to benefit from the increased operational efficiency possible through traversing the rarified atmosphere when traveling from widely spaced points on the earth's surface.

Since no one fuselage shape or wing configuration can be most efficient at all conditions of speed and air density, there is a need for a vehicle design which adapts itself to changing conditions of flight. A vehicle which is efficient in all of the speed ranges and at atmospheric pressures from those sea level to the substantial vacuum of space must adapt to the following conditions:

(1) Loss of control as the wing and empennage surfaces no longer create a pressure differential during flight.

(2) The difference in effect that a given change of control surface attitude makes in the course of the vehicle under different speed and air density conditions.

(3) The relationship of the shock wave propagated by the nose of the vehicle to the fuselage and remainder of the vehicle.

A flight vehicle adapted to meet all of the requirements set forth above must be capable of modifying its outward configuration, must have a flight control system operable in or out of the atmosphere, and must have compensating means for changing the response of the vehicle control surfaces to the operating input load imposed upon the surfaces. The invention contemplates such a vehicle which comprises a fuselage or comparable body structure, an empennage which may have vertical and horizontal stabilizers, and means for moving the empennage with respect to the fuselage. A propulsion source is mounted on the movable empennage. A heat sensing cell is also carried by the empennage. A nose cone movable with respect to the fuselage and empennage is adjustable with respect thereto by means responsive to a change in the condition of the heat sensing cell.

The preferred embodiment of the flight vehicle in accordance with the invention also comprises means responsive to the load imposed upon the nose cone for modifying the motion transmitted by the cockpit controls to the control surfaces.

The concept of the invention may be embodied in a research flight vehicle which would be manned, and equipped with various recording and transmitting instruments to preserve and transmit to a telemetering system the responses of various components of the vehicle. The speeds contemplated for such a vehicle give no appreciable time for human reflexes or thought processes to solve problems. It is preferable to correlate the flight controls and other mechanisms of the vehicle by means of an electronic computer.

The nose cone of the preferred embodiment of the invention is positioned with respect to the fuselage and empennage by means of a hydraulic ram. The ram pumps are actuated by a master servo-mechanism whose response to signals from the heat sensing cell are in turn controlled by the computer which is pre-set to modify responses in compliance with the needs of the vehicle. Preferably the heat sensing cell is a thermocouple which is connected through a pre-amplifier and amplifier. The amplifier may feed directly to the master servo unit or the signal therefrom may be incorporated into auxiliary circuits so that the pilot of the vehicle may defeat the automatic response system.

The empennage is coupled to the fuselage proper in such a manner that it has two degrees of freedom with respect to the longitudinal axis of the fuselage. Thus, the geometric longitudinal and transverse dihedral angles of the vertical and the horizontal stabilizer respectively with respect to the longitudinal axis may be changed.

A propulsion unit which may be either air breathing or rocket-like is preferably fixed to the upper portion of the empennage. Flight control can be achieved through the change in position of the empennage with respect to the longitudinal axis of the fuselage since empennage re-positioning changes the thrust line of the propulsion source. The positioning of the power unit or propulsion source at the top of the empennage is preferable to gain a mechanical advantage, since a small change in the alignment of the propulsion unit with respect to the fuselage has a large effect on the course of the fuselage.

The advantage of a nose cone articulated with respect to the fuselage is that the shock wave pattern may be altered with respect to the fuselage. At speeds above the speed of sound a shock wave emanates from the extreme compression point of the air ahead of the nose cone of the flight vehicle. The trailing pattern of the shock wave differs with the speed of the vehicle and the density of the atmosphere. The vehicle resides within the substantially cone-like zone thus created. Any change in speed or atmospheric pressure results in a different shock wave pattern. No fuselage or comparable body unit can be designed which is efficient over a large range of flight conditions. The movable nose cone of the invention in effect modifies the configuration of the fuselage. The movement of the nose cone with respect to the fuselage effectively alters the position of the fuselage with respect to the shock wave. Forward movement of the nose cone has the same effect as an increase in speed. In the speed region of Mach 1.5 the shock wave tends to enevelop the fuselage in a hyperboloid. In a profile view the shock wave shows as a wedge pointed in flight direction. The wedge widens as the wave trails rearwardly from the nose. If the angle of the wedge is acute, the shock wave impinges upon the stagnant boundary layer with a resultant high thermal transfer to the fuselage.

A given fuselage cannot be shrunk to escape the effect of the shock wave as flight conditions change. However, if the apex of the wave is moved ahead with respect to the fuselage, the fuselage will in effect be flying in a wider portion of the shock wave wedge. Therefore, the previously described forward displacement of the nose cone with respect to the fuselage enables the fuselage itself to escape from the buffeting and heating effect of the shock wave.

The displacement of the nose cone also changes its relationship to the propulsion source. A minimum displacement of the nose cone is desirable since the change in the center of gravity will be effected by over displacement. Heat engendered by the shock waves, or heat engendered by pure air slip when the vehicle is operated at speeds below Mach 1, is read by the heat sensing cell, transmitted through the previously described system so that the master servo may adjust the position of the nose cone. When the nose cone advances too greatly, the heat sensing cell is within the partial vacuum created by the diversion of the shock wave and records a temperature which causes retraction of the nose cone.

The position of the nose cone is particularly critical when the propulsion unit is an air breathing one. Propulsion, of course, fails if the position of the nose cone causes such a diversion in the shock wave pattern that the intake of the propulsion unit is within the rarified zone surrounding the fuselage. Positioning the heat sensing cell in close proximity to the propulsion unit at the top of the empennage provides for fine control of the shock wave pattern and the volume of the rarified zone around the fuselage.

These and other advantages of the invention are apparent from the following detailed description and drawing in which:

FIG. 3 is an elevational view partly broken away of the preferred embodiment of the invention similar to FIG. 2 with the location of the main components of the vehicle mechanism shown in dotted lines; and FIG. 4 is a line diagram of the control system of the preferred embodiment of the invention showing the correlation between the various components of the vehicle.

Figure 1:
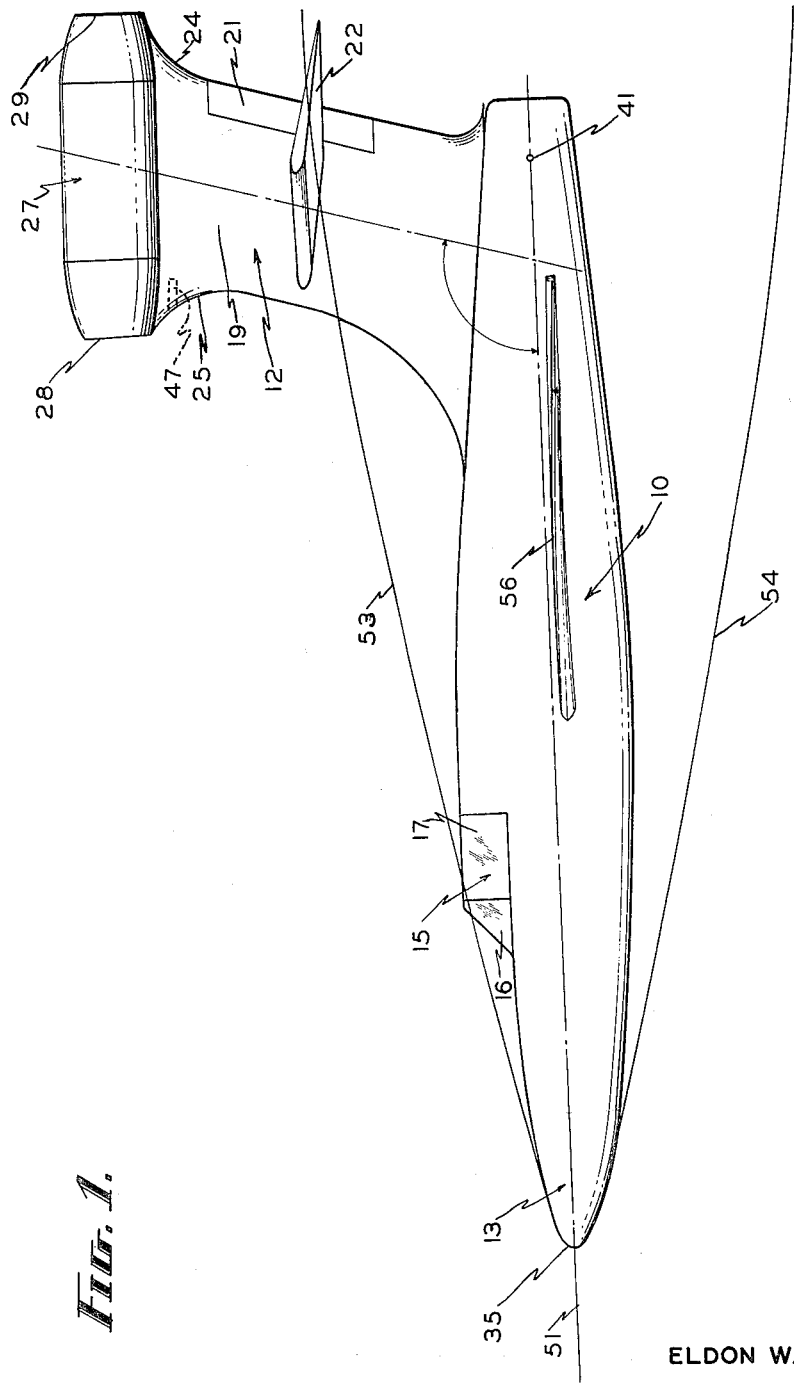
FIG. 1 is a schematic elevation of a preferred form of the invention in substantially level flight with the nose cone retracted and showing the shock wave pattern.
Figure 2:
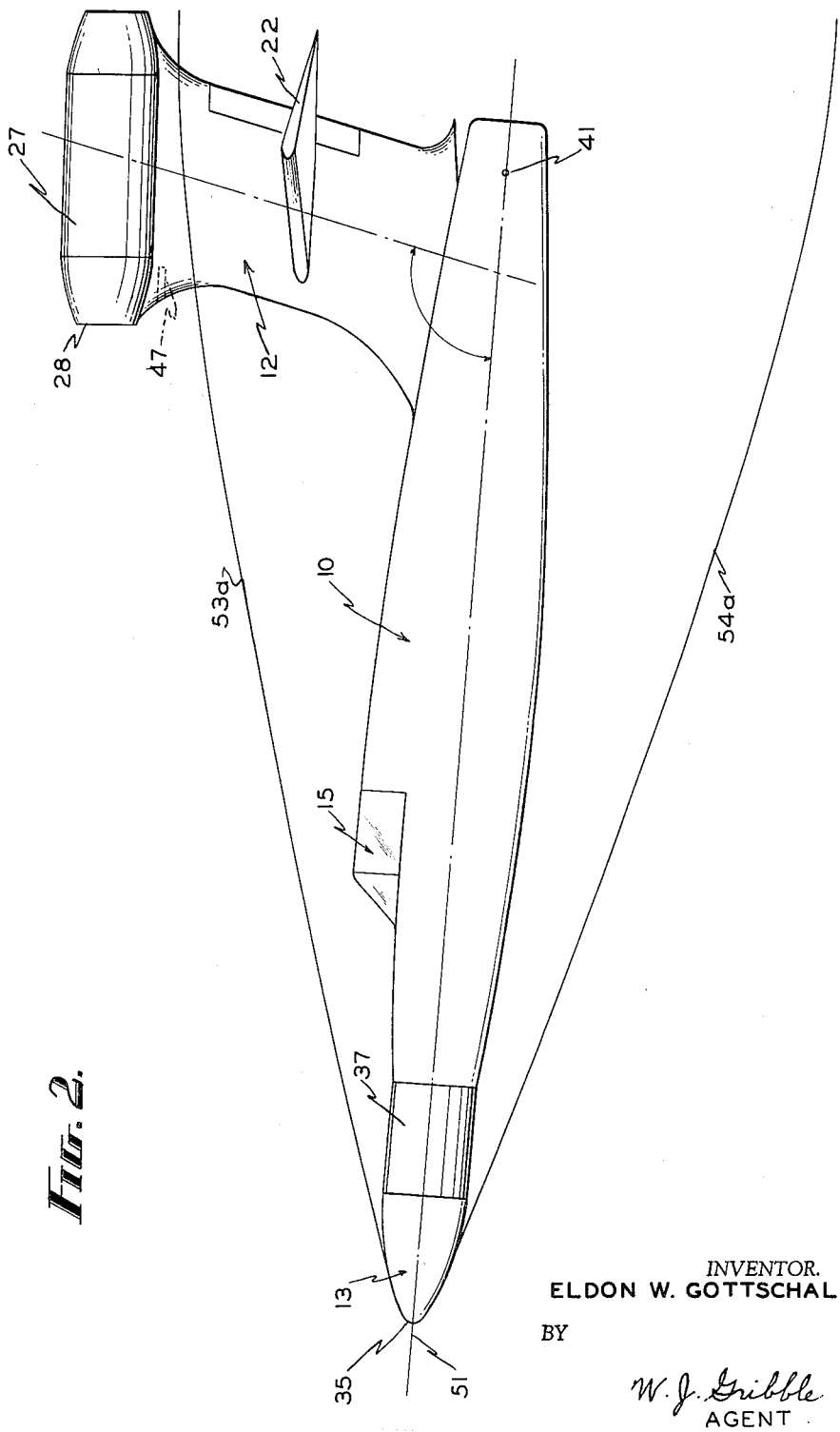
FIG. 2 is a schematic elevation similar to FIG. 1 with the nose cone positioned forwardly of the fuselage and the angle of the empennage with respect to the fuselage altered.

FIGS. 1 through 3 illustrate a research flight vehicle 10 having a fuselage 11 surmounted by an empennage 12, and a nose cone 13. The fuselage has a cockpit 15 which is enclosed with transparent panels such as the panels 16 and 17.

The empennage comprises a vertical stabilizer 19 having a vertical rudder 21 and horizontal stabilizers 22. The top of the empennage fairs outwardly at 24 and 25 to mount a propulsion source 27. The propulsion source may be a jet engine having an intake 28 and a discharge end 29.

Preferably the nose cone has the blunt configuration associated with the Van Allen re-entry cone used on the present series of guided missiles. The nose cone is adapted to be moved with respect to the fuselage. Movement is accomplished by means of a ram 31 housed in a conventional hydraulic cylinder shown by dotted lines 33 in FIG. 3.

The nose cone has a rounded blunt point 35 and is shown extended forwardly with respect to the fuselage in FIGS. 2 and 3. A cylindrical skirt 37 connects between nose cone 13 and the fuselage proper when the nose cone is extended. The cylindrical skirt acts as a shroud to preclude turbulence in the area between the rear portion of the extended nose cone and the front of the fuselage. The skirt fits within an annular recess 39 at the forward end of the fuselage.

The empennage carrying the propulsion source 27 is secured to the fuselage so that it may be moved in the vertical plane bisecting the fuselage longitudinally. The empennage may also be pivoted with respect to the fuselage about a point 41. Point 41 represents the effective pivot point of a ball-gimble mount shown by the dotted lines 43 at the rear of the fuselage.

A structural shaft 45 extends substantially vertically from the gimble mount upwardly through the empennage. Suitable bracing may extend from the shaft through the interior of the empennage. A heat sensitive thermocouple 47 is carried by the empennage adjacent the fairing 25 near the inlet of the propulsion source. Connecting conduit extends from the thermocouple horizontally through the empennage to shaft 45 and then downwardly through the center of the shaft into the fuselage proper. The signal carried by the conduit is then fed to signal modifying means whose locations are shown in FIG. 3 and explained later with respect to FIG. 4.

In FIG. 1 the research flight vehicle 10 is shown with nose cone 13 fully retracted. Skirt 37 resides entirely within the fuselage. The attitude of the vertical stabilizer of the empennage is such that a longitudinal axis 51 of the fuselage is substantially horizontal and the vehicle maintains a horizontal flight path. The profile outline of the shock wave pattern is shown by lines 53 and 54 in FIG. 1, and 53a and 54a in FIG. 2. The revolution of these lines about axis 51 of the fuselage describes a hyperboloid in which the fuselage resides. The shock waves represented in FIGS. 1 and 2 are those which result from a nose cone of the illustrative configuration traveling at a velocity approximately Mach 3 at an altitude of 30,000 feet. The hyperboloids defined by the lines 53 and 54 of FIG. 1 and lines 53a and 54a of FIG. 2 are substantially the same with respect to front end 35 of the nose cone. However, the position of the fuselage within the hyperboloid is substantially different in the two figures because of the varying projection of the nose cone in the two figures. In the flight condition illustrated in FIG. 2 the nose cone is forward. In FIG. 1 the fuselage is subject to the transfer of pressure represented by the shock wave to the tangential boundary layer of more slowly flowing air about the skin of the fuselage. The contact between the high pressure front represented by the shock wave and the tangential boundary layer of air flow around the fuselage and other vehicle surfaces causes an intense heat transfer to the skin. If the velocity of the vehicle and the density of the air are great enough, the heat build up will destroy the usefulness of the vehicle.

The cost of constructing the entire flight vehicle of materials to withstand the heat engendered by speeds in the supersonic and ultrasonic range is prohibitive. However, as the diagrammatic illustration of FIG. 2 demonstrates only the nose cone and the upper part of the empennage including the engine nacelle need be constructed to withstand the high temperature engendered by the described conditions. When the nose cone is extended as shown in FIG. 2, the high pressure front represented by the shock wave is remote from the fuselage and most of the vehicle components so that a relatively rarified zone within the hyperboloid of the shock wave insulates the vehicle from the effects of the wave.

The position of the heat sensing thermocouple 47 is to a large extent dependent upon the utility of the vehicle. If the vehicle is a winged transition vehicle capable of flight in the subsonic range as well as in the trans and supersonic spectrum, the position of the thermocouple is preferably such that the shock wave configuration barely includes the thermocouple within the hyperboloid and also includes the wing and stabilizer surfaces of the vehicle within that substantially rarified zone. If the propulsion source of the flight vehicle is an air breathing one such as the jet engine illustrated in FIGS. 1 through 3, it is necessary that the maximum diversion of the shock wave exclude the inlet of the propulsion source from the rarified zone.

The illustrative embodiment of the invention utilizes a jet propulsion source. The optimum position for the thermocouple which senses the heat condition of the vehicle is near the inlet of the jet engine so that the heat transfer occurring because of the shock wave may be sensed and used to position the nose cone with respect to the fuselage. At any given velocity the diversion of the wedge of the shock wave is dependent upon the isentropic density of the air being traversed. Therefore, at an exemplary velocity like Mach 3 and atmospheric density equal to 30,000 feet altitude, the diversion of the shock wave wedge with the nose cone extended forwardly as in FIG. 2 excludes the thermocouple from the rarified zone of the shock wave hyperboloid. The heat transfer to that region of the empennage is sensed by the thermocouple. The heat of the skin in this region exceeds that of the fuselage. When the heat reaches a critical point, the mechanisms and controls receiving the signals from the thermocouple cause a further forward displacement of the nose cone with respect to the fuselage. Forward displacement has the effect of widening the shock wave wedge and including the thermocouple within the rarified zone of the shock wave hyperboloid. Thereafter heat transfer to the area of the empennage supporting the thermocouple lessens. Therefore, that area cools down and a minor withdrawal of the nose cone from its most forward position takes place with a consequent diminution of the wedge in the area of the thermocouple. The diameter of the hyperboloid at the thermocouple location can be maintained relatively constant if proper corrective means to prevent "hunting" are incorporated in the circuit.

The temperature sensed by the thermocouple is a controlling factor. Flight conditions of course change with variation of atmospheric density or vehicle velocity. The shock wave configuration therefore also changes. However, diameter of the hyperboloid at the thermocouple point is determined by the nose cone position which is adjusted in accordance with thermocouple condition. The diameter can be maintained substantially constant through the entire flight range for which the vehicle is designed by proper response to the thermocouple.

The inventive principle of changing vehicle configuration is applicable to any flight vehicle which must traverse the atmosphere. The position of the nose cone can be regulated to protect from heat a flight vehicle whether the vehicle is designed to operate exclusively within the atmosphere or whether its ultimate destination lies without the atmosphere. The principle has application to the problem of re-entry into the atmosphere after flights through the substantially zero atmospheric pressure areas above the earth's air blanket. Nose cone adjustment precludes the heat build up normally encountered by an object re-entering the earth's atmosphere. The proposed skip technique of slowing a re-entering vehicle by successive encounters with the less dense upper atmosphere is not necessary with a vehicle embodying the design of the invention. Much time and fuel can be saved by direct re-entry with a vehicle in accordance with the invention.

The illustrative vehicle is capable of precise flight control. The power source is articulated with respect to the fuselage. It may therefore be used to guide the vehicle in the speed range above Mach 1.5 in which the slip stream configuration makes the control surfaces normally used incapable of efficiently affecting the flight of the vehicle.

The means for securing the empennage and the propulsion unit supports to the fuselage are such that the empennage may be moved in a vertical plane bisecting the fuselage. It may also be pivoted with respect to the longitudinal axis of the fuselage. Thus, both attack angle and horizontal attitude may be changed by altering the position of the empennage.

Additionally, when control surfaces are operative at speeds below Mach 1.5, the attitude of the horizontal stabilizer with respect to the horizontal wing which the vehicle may have may be changed by means of the empennage position, augmenting the normal elevator and like controls with which conventional stabilizers are equipped.

The illustrative vehicle is one in which manned flight is contemplated. The cockpit controls are optimum when the same controls may be used at all flight stages. However, in the conventional flight vehicle such controls represent a flight problem since the effect of the movement of the controls through a given increment varies with the flight conditions under which the plane is operating. The control motion which causes a certain course deviation at one speed and air density gives a different flight course deviation at a higher speed and air density. The invention incorporates means for modifying the amount of control surface response to a given movement of the cockpit controls in relation to the total resistance encountered by the nose cone.

The description of this facet of the invention is best understood with reference to FIG. 4. FIG. 4 is a diagrammatic presentation of the control system for a preferred embodiment of the invention. Parts identical to those described with respect to FIGS. 1 through 3 are given the same reference numbers given in the description of FIG. 4. The control system in FIG. 4 is designed to control the flight of a manned vehicle through a velocity range from subsonic to above sonic. The control system incorporates means for modifying the effect of cockpit control movements in relation to changed flight conditions. Conventionally, as velocity increases, a given control motion causes greater acceleration forces on the vehicle and its occupants. Therefore, a given maneuver executed in habitual manner may result in harmful effects. For instance, a 90° turn at Mach 5 is accomplished in approximately one-sixth the time required for the same turn at Mach 2 with the same control setting. The dangers from such a situation are obvious.

In contrast, the invention modifies control effect so that the forces involved in a given maneuver are substantially the same at all velocities.

Control modification is also desirable because of the tremendous difference between the "feel" of the controls sensed by the pilot at the diverse flight conditions for which the vehicle is designed. As described heretofore, the effect of the cockpit control motion may be modified in accordance with the resistance loading on the nose cone, since the resistance loading changes with changes in the velocity of the vehicle and air density encountered in flight.

The position of the nose cone with respect to the fuselage and empennage is, as previously described, controlled by the response to surface heat of the thermocouple 47. The thermocouple is connected electrically to a pre-amplifier 57 and a first amplifier 58. The positions of the pre-amplifier and the amplifier as well as the approximate positioning of the remaining components of the control system are shown in dotted lines within the fuselage of FIG. 3.

The output of the first amplifier is fed to a selector switch 65. A telemeter transmitter 67 is coupled in parallel with the selector switch. The transmitter sends to a telemetering station the heat conditions encountered during flight. Other data from other similar sensing devices may also be transmitted.

Selector switch 65 may make contact with either of two terminals 69, 71. Terminal 69 connects to a master servo-mechanism 73. Terminal 71 leads to a computer 75. Control of the vehicle may therefore be achieved either through direct response of the master servo-mechanism to signals from the thermocouple or such signals may be first modified by a computer whose logic is adjusted to pre-determine the vehicle's response to specific signals from the thermocouple. A hydraulic supply line 77 connects between the master servo and a hydraulic cylinder 79. The hydraulic cylinder contains the ram and a ram piston 81 which serves to advance the nose cone in the manner previously described.

A hydraulic fluid sump 83 supplies fluid to the cylinder through a supply line 85 leading from the sump to the master servo-mechanism. Conventional means within the servo-mechanism connect supply line 85 and cylinder line 77 in response to signals from the thermocouple. A primary pump 87 and a booster pump 89 impel the hydraulic fluid from the sump to the servo-mechanism. A fluid return line 91 extends from the rear of the cylinder through a valve 93 to a heat exchange coil 95. The coil is coupled into servo-mechanism 73. Fluid returns from the servo-mechanism to the sump through a return line 97 under the urging of a pump 99. Valve 93 also controls return fluid flow from the front of the cylinder through lines 100 and 101, which connect to the cylinder volume adjacent the front face of the piston.

In the preferred embodiment of the invention the master servo-mechanism is a multiple valving system. The valves change settings in response to the signals received from the thermocouple 47. Valve 93 connects return fluid line 91 with the heat exchange coil. It is controlled by the master servo-mechanism and may be a part thereof. Valve 93 additionally connects a hydraulic conduit 101 with the heat exchange coil. Lines 101 and 102 supply hydraulic fluid to the front face of piston 81 by way of the servo-mechanism to accomplish retraction of the nose cone with respect to the fuselage. The nose cone is advanced by fluid flow into the cylinder through line 77, and a like fluid flow from the cylinder through lines 101 and 100. No flow from line 101 to line 102 then occurs because line 102 is closed by the servo-mechanism. During nose cone retraction valve 93 closes line 100 so that line 102 supplies only line 101.

Cockpit controls 103 instigate commands which are fed to a saturable reactor 105. The output of the saturable reactor is communicated through leads 106 and 107 to a first rectifier 108 and a second rectifier 109 respectively. Rectifier 108 supplies direct current to a second servo-mechanism 111 which actuates the empennage control surfaces. Rectifier 109 supplies the direct current to a third servo-mechanism 113 which actuates the wing control surfaces.

The output of the saturable reactor is preferably modified by the resistance loading on the nose cone. The resistance loading is measured by a secondary piston 115 movable against the calibrated pressure of a spring 117 within a small cylinder 119 at the rear of the main hydraulic cylinder 79 of the nose cone ram. As the resistance loading on the nose cone changes, the position of secondary piston 115 is also changed and moves a solid core 121 within an inductance coil 123. Current flow from a D.C. power source 125 is modified by the position of the core within the coil. In turn the magnitude of the D.C. current flow causes alterations in the flow of A.C. current from a supply 127 through the saturable reactor. Therefore, the commands instituted by the cockpit controls are modified in response to the resistance loading on the nose cone by means of the alteration in the A.C. flow to the rectifiers supplying the second and third servo-mechanisms.

Selector switch 65 may be positioned against terminal 71 so that signals from thermocouple 47 flow directly to computer 75 instead of to the master servo-mechanism. Such circuitry is desirable if a particular flight pattern or nose cone position is desired in response to a particular signal or range of signals from the thermocouple. In such a situation the computer contains a switch mechanism (not shown) which communicates by means of a lead 131 to the output terminals of the saturable reactor and defeats that output. Instead, leads 133 and 134 transfer the A.C. output of the saturable reactor to the computer.

This transferred A.C. output is modified in accordance with the logic imposed by the computer and is then fed to rectifiers 108 and 109. The valving functions of the master servo-mechanism are performed under signals from the computer communicated to the servo-mechanism by a lead 137. Pumps 85, 87, and 89 may also be controlled by signals from the computer so that their operation is variable. This control by the computer enables the output of the pumps to vary with the demands of the system, thus, lessening the load upon the master servo-mechanism valving system.

A hydraulic differential transmission may be substituted for the saturable reactor by suitable changes in the described circuitry. However, a saturable reactor is preferable because of the advantages of its slight weight in comparison to a hydraulic transmission.

The preferred embodiment of the invention described with respect to the figure is a flight vehicle capable of efficient flight under a vast range of conditions of velocity and atmospheric pressure. It is capable of high velocity re-entry into the atmosphere without the necessity for skip-entry or other time consuming techniques. Although the preferred embodiment is described in conjunction with a jet engine propulsion source, the concept of the invention is equally adaptable to flight vehicles utilizing various means of rocket propulsion. The invention is not limited to flight vehicles which have air breathing engines.

I claim:

1. A self propelled flight vehicle comprising a fuselage, a propulsion source movable with respect to the fuselage, sensing means adapted to register exterior surface temperatures of the vehicle, a nose cone, and means responsive to temperature changes registered by the sensing means adapted to alter the position of the nose cone with respect to the fuselage.

2. A self propelled flight vehicle comprising a fuselage, a propulsion source, a nose cone, means registering exterior surface temperatures of the vehicle, means for altering the position of the nose cone with respect to the fuselage, and means responsive to the temperature registered to control the means for altering the position of the nose cone.

3. Apparatus in accordance with claim 2 in which the means for controlling the means for altering the nose cone position is an electronic computer.

4. Apparatus in accordance with claim 2 in which the propulsion source is movable with respect to the longitudinal axis of the fuselage.

5. A self propelled flight vehicle comprising a fuselage, an empennage having vertical and horizontal stabilizers, means for moving the empennage with respect to the fuselage, a propulsion source mounted on the movable empennage, a heat sensing cell on the empennage, a nose cone movable with respect to the fuselage and empennage, and means responsive to a change in the condition of the heat sensing cell for altering the position of the nose cone with respect to the fuselage and empennage.

6. A self propelled flight vehicle comprising a fuselage, a heat sensing cell mounted on the vehicle adapted to register exterior surface temperatures, a nose cone movable with respect to the fuselage, and means responsive to temperature changes registered by the cell adapted to move the nose cone with respect to the fuselage.

7. A self propelled flight vehicle comprising a fuselage, a nose cone, an empennage, a propulsion source on the empennage remote from the fuselage, a heat sensing cell carried by the empennage adjacent the propulsion source, hydraulic means for altering the position of the nose cone with respect to the fuselage, and control means modifying the action of the hydraulic means, the control means being responsive to the heat level registered by the heat sensing cell.

8. Apparatus in accordance with claim 7 in which the control means comprises an electronic computer.

9. A self propelled vehicle comprising a winged fuselage, an empennage having vertical and horizontal stabilizers and being movable as a unit with respect to the fuselage, a propulsion source mounted on the empennage remote from the fuselage, a heat sensing thermocouple carried by the empennage at the leading edge thereof, a nose cone, a source of hydraulic fluid, a hydraulic cylinder, a piston movable in the cylinder to displace the nose cone with respect to the fuselage, a master servo-mechanism adapted to control the flow of hydraulic fluid into the hydraulic cylinder, a secondary piston movable in response to pressure changes in the hydraulic cylinder, a core adapted to be displaced by motion of the secondary piston, a power source, an induction coil in which the core is movable to vary the electrical flow therethrough, manually operable flight controls adapted to implement a flow of current, a saturable reactor electrically connected to the flight controls, a source of power linked to the saturable reactor, means responsive to the output of the reactor for moving the empennage with respect to the fuselage, an electronic computer, amplification means linking electrically the thermocouple and the computer, means linking the computer and the master servo-mechanism to control the operation of the servo-mechanism in response to modification of the signal from the thermocouple in response to the logic of the computer, and electrical means interconnecting the saturable reactor and the computer, induction coil, and manual flight controls so that the output of the reactor is the sum of the conditions imposed thereby.

References Cited in the file of this patent

UNITED STATES PATENTS

| | | |
|---|---|---|
| 2,188,834 | Fischel et al. | Jan. 30, 1940 |
| 2,512,790 | Cleveland | June 27, 1950 |
| 2,563,757 | Thorp | Aug. 7, 1951 |
| 2,580,176 | Johnson | Dec. 25, 1951 |
| 2,652,994 | Feeney | Sept. 22, 1953 |
| 2,759,686 | Griffith | Aug. 21, 1956 |
| 2,805,032 | Davis | Sept. 3, 1957 |
| 2,829,490 | Kresse | Apr. 8, 1959 |